United States Patent
Liu et al.

(10) Patent No.: US 10,820,207 B2
(45) Date of Patent: Oct. 27, 2020

(54) BACKWARD COMPATIBLE FRAME REUSE BY USING PREDETERMINED MASKING SEQUENCE

(71) Applicant: MEDIATEK INC., Taiwan (CN)

(72) Inventors: Jianhan Liu, San Jose, CA (US);
Tianyu Wu, Fremont, CA (US);
Rongsheng Huang, Fremont, CA (US);
James June-Ming Wang, San Marino, CA (US)

(73) Assignee: MEDIATEK INC., Taiwan (CN)

( * ) Notice: Subject to any disclaimer, the term of this patent is extended or adjusted under 35 U.S.C. 154(b) by 252 days.

(21) Appl. No.: 15/590,851

(22) Filed: May 9, 2017

(65) Prior Publication Data

US 2017/0332241 A1   Nov. 16, 2017

Related U.S. Application Data

(60) Provisional application No. 62/333,898, filed on May 10, 2016.

(51) Int. Cl.
*H04W 40/00* (2009.01)
*H04W 16/02* (2009.01)
*H04W 16/14* (2009.01)
*H04W 28/02* (2009.01)
*H04J 3/16* (2006.01)
*H04W 74/00* (2009.01)
*H04L 1/00* (2006.01)

(52) U.S. Cl.
CPC ........... *H04W 16/02* (2013.01); *H04J 3/1617* (2013.01); *H04L 1/00* (2013.01); *H04W 16/14* (2013.01); *H04W 28/0273* (2013.01); *H04W 74/002* (2013.01); *H04J 2203/0001* (2013.01)

(58) Field of Classification Search
CPC ....... H04B 7/212; H04B 7/2643; H04W 4/14; H04W 16/12; H04W 24/00; H04W 28/04; H04W 72/04; H04W 84/08
USPC ............... 370/321, 329, 337, 341, 347, 349; 455/447, 450–451, 452.1–452.2, 466
See application file for complete search history.

(56) References Cited

U.S. PATENT DOCUMENTS

| | | | |
|---|---|---|---|
| 8,396,064 B2 | 3/2013 | Giesberts et al. | |
| 2006/0078001 A1 | 4/2006 | Chandra et al. | |
| 2006/0268997 A1* | 11/2006 | Thaler | H03M 5/145 375/242 |
| 2014/0044038 A1* | 2/2014 | Zhang | H04L 1/1854 370/328 |

(Continued)

*Primary Examiner* — Matthew W Genack (57) ABSTRACT

A backward compatible frame reuse mechanism that allows new information to be defined a reused frame without causing any incorrect operation in a legacy receive device. To generate a reused frame, a portion of the frame in the first format is masked with a predetermined masking sequence (PMS) and thereby redefined as new fields in a second format. When a device that supports the reuse scheme receives a frame that possible is a reused frame, the device checks the potentially reused portion according to the first format after de-masking and also checks according to the second format without de-masking. Based on the check results, the device selects a format to resolve the frame. A legacy device receiving the reused frame only checks the reused portion without de-masking, which results in a certain check error and makes the device discard the frame without any harmful operation.

21 Claims, 9 Drawing Sheets

(56) References Cited

U.S. PATENT DOCUMENTS

| | | | |
|---|---|---|---|
| 2014/0050230 A1* | 2/2014 | Bao | H04L 1/18 370/474 |
| 2014/0254594 A1* | 9/2014 | Gasparakis | H04L 45/74 370/392 |
| 2015/0244619 A1* | 8/2015 | Zheng | H03M 13/09 370/392 |
| 2016/0270079 A1 | 9/2016 | Seok | |
| 2017/0300444 A1* | 10/2017 | Maletsky | G06F 13/4027 |

* cited by examiner

BACKWARD COMPATIBLE FRAME REUSE BY USING PREDETERMINED MASKING SEQUENCE

CROSS-REFERENCE TO RELATED APPLICATION

This patent application claims priority and benefit of U.S. Provisional Patent Application No. 62/333,898, entitled "BACKWARD COMPATIBLE FRAME RE-USE SCHEMES," filed on May 10, 2016, the entire content of which is herein incorporated by reference for all purposes.

TECHNICAL FIELD

The present disclosure relates generally to the field of network communication, more specifically, to the field of backward compatible mechanisms in wireless network communication.

BACKGROUND OF THE INVENTION

Various aspects of most network communication systems have evolved through multiple generations. It is often desirable that a later generation device, protocol, or technology be backward compatible with its earlier generation counterpart, the so-called legacy.

In the wireless communication realm, due to complex reasons, some control or management frames need to preserve substantially the same frame format through generations of development, e.g., the format requires using a fixed frame bit length. Unfortunately, typically in such a frame, nearly all the fields have been designated for indicating well-defined information. This greatly restricts the capability of introducing new features to a backward compatible new generation system because a new feature usually needs new control or signaling information to be included in a control or management frame that may not have enough room to accommodate the new information. Reusing a field for new information is prone to misunderstanding by the legacy devices which are configured according to the earlier generations, thereby causing unintended and incorrect operations of the legacy devices.

For example, while a certain control frame is transmitted from an Access Point (AP) device, it is important that no other data signal is transmitted from other stations (STAs) in the same Basic Service Set (BSS). However, if a legacy device in the BSS misunderstands the new information contained in the control frame or is incapable of learning its frame length, it may transmit data signals and interfere with the transmission of the control frame.

Even some unused or reserved fields in a backward compatible control or management frame should not be used (or reused) for conveying new control or signaling information because these fields commonly have been used in proprietary products of earlier generations. Redefining them to carry new information would cause interconnect issues. Therefore, there lacks an effectively approach to redefine and reuse the fields in a management or control frame to make the frame backward compatible.

SUMMARY OF THE INVENTION

Accordingly, methods and systems disclosed herein are directed to a backward compatible frame reuse scheme that allows introduction of new control or signaling information to a control or management frame which can be either correctly deciphered by a receive device or ignored by a receive device without causing any incorrect operation or other harmful responses.

Embodiments of the present disclosure include generating a control or management frame in a first frame format and then masking the information in a portion of the frame for conversion to new information as defined in a second frame format. In some embodiments, the portion may be the Frame Check Sequence (FCS) of a Media Access Control (MAC) frame or encompassed by a MAC frame header. For example, the first frame format is defined in an old communication protocol, and the second frame format is defined in a new communication protocol. The masking process involves performing a predetermined logical operation on a predetermined masking sequence and the portion of the frame to be reused.

From the viewpoint of a device that supports the reuse scheme (e.g., a new generation device) and receives the reused frame, the reused portion may carry either information as defined in the first frame format or information as defined in the second frame format. Upon receiving the converted frame, the receive device de-masks the reused portion and then checks the information therein according to the first frame format. Simultaneously or sequentially, the receive device also checks, without de-masking, the reused portion according to the second frame format. Based on the check results, the device selects one of the two frame formats to resolve the reused portion.

On the other hand, a legacy device that does not support the reuse scheme and yet receives the converted frame (or reused frame) only checks the reused portion without de-masking. The reused portion would result in a check failure and the device accordingly discards the frame without any incorrect operation. Moreover, as the converted frame preserves the same frame length as the original frame, the legacy device can avoid transmitting data until the transmission of the converted frame is completed.

According to embodiments of the present disclosure, by using a predetermined masking operation and a predetermined masking sequence, a portion in a control or management frame can be advantageously reused and redefined for carrying new information. A receive device that supports this reuse scheme can identify the frame format used in the portion and thereby decipher the new information correctly. Moreover, the reused portion advantageously causes no incorrect operation or transmission interference by legacy receive devices that do not support the reuse scheme, advantageously achieving backward compatibility with the legacy receive devices.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

BACKWARD COMPATIBLE FRAME REUSE BY USING PREDETERMINED MASKING SEQUENCE

Overall, embodiments of the present disclosure use a predetermined masking operation to convert a portion of a frame into a reused portion which can be correctly deciphered by a receive device that supports the reuse scheme and yet causes no incorrect response by a legacy receive device.

Figure 1A:
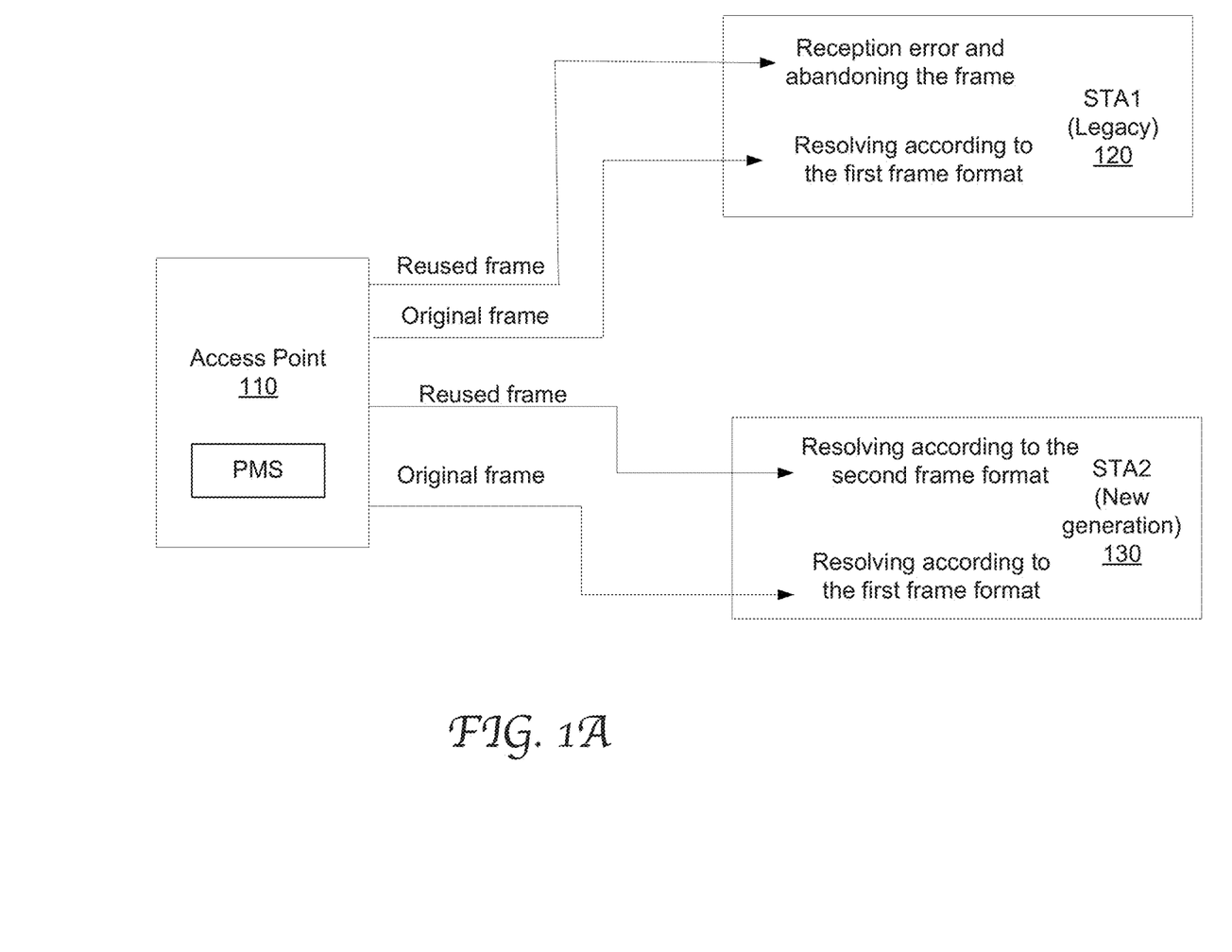
FIG. 1A illustrates an exemplary wireless communication network system including devices that can transmit and receive reused frames in accordance with an embodiment of the present disclosure.

FIG. 1A illustrates an exemplary wireless communication network system 100 including devices that can transmit and receive reused frames in accordance with an embodiment of the present disclosure. System 100 includes an Access Point (AP) device 100 and wireless terminal stations STA1 120 and STA2 130, for example arranged in a Basic Service Set (BSS). The STA1 120 is a legacy device that does not support the reused scheme, whereas the STA2 130 is a new generation device that does support the scheme. It will be appreciated that the preset disclosure is not limited to any specific network topology or architecture, nor limited to any specific communication protocol or standard used to transmit a reused frame according to embodiments of the present disclosure. Further, any types of suitable network devices can be configured to generate and/or resolve reused frames, for example an STA, an AP or a Personal Basic Service Set (PBSS) Control Point (PCP).

As described in greater detail below, the AP 110 can generate a frame according to the first frame format (an "original frame") and a corresponding frame according to the second frame format (a "reused frame"). For instance, the first frame format is defined in an old generation communication protocol, while the second frame format is defined in a new generation communication protocol. The two protocols may be both defined in the IEEE 802.11x standard family, and may be in the same standard or different standards.

The reused frame is generated by performing a predetermined masking operation on a portion of the original frame and a predetermined masking sequence (PMS), thereby converting the first information in the portion as defined in the first frame format to new information (the second information) as defined in the second frame format. In some embodiments, the reused portion may include the Frame Check Sequence (FCS) of the original frame.

The reused frames are intended for STAs which can support the reuse scheme and interpret the second frame format, whereas the original frames are intended for the legacy STAs which can only interpret the first frame format, e.g., STA1 120. The new generation device STA2 130 has the capability of accepting and resolving the reused frames as well as the original frame. However, when the legacy device STA1 120 receives a reused frame from the AP 110 and attempts to interpret it according to the first frame format, a check error (e.g., an FCS check error) certainly results so that the device decides to abandon the received frame. Therefore, the reused frame advantageously causes no adverse consequence on the legacy device.

The present disclosure is not limited to any specific type of communication frames or specific portion of a frame that can be reused, nor is it limited to any specific type or amount of information that can be indicated in a reused portion in a frame. A reused frame may be used to deliver control and management information, and the reused portion may be redefined to carry any newly added information, such as new control, signaling or feedback information, and etc.

Figure 1B:
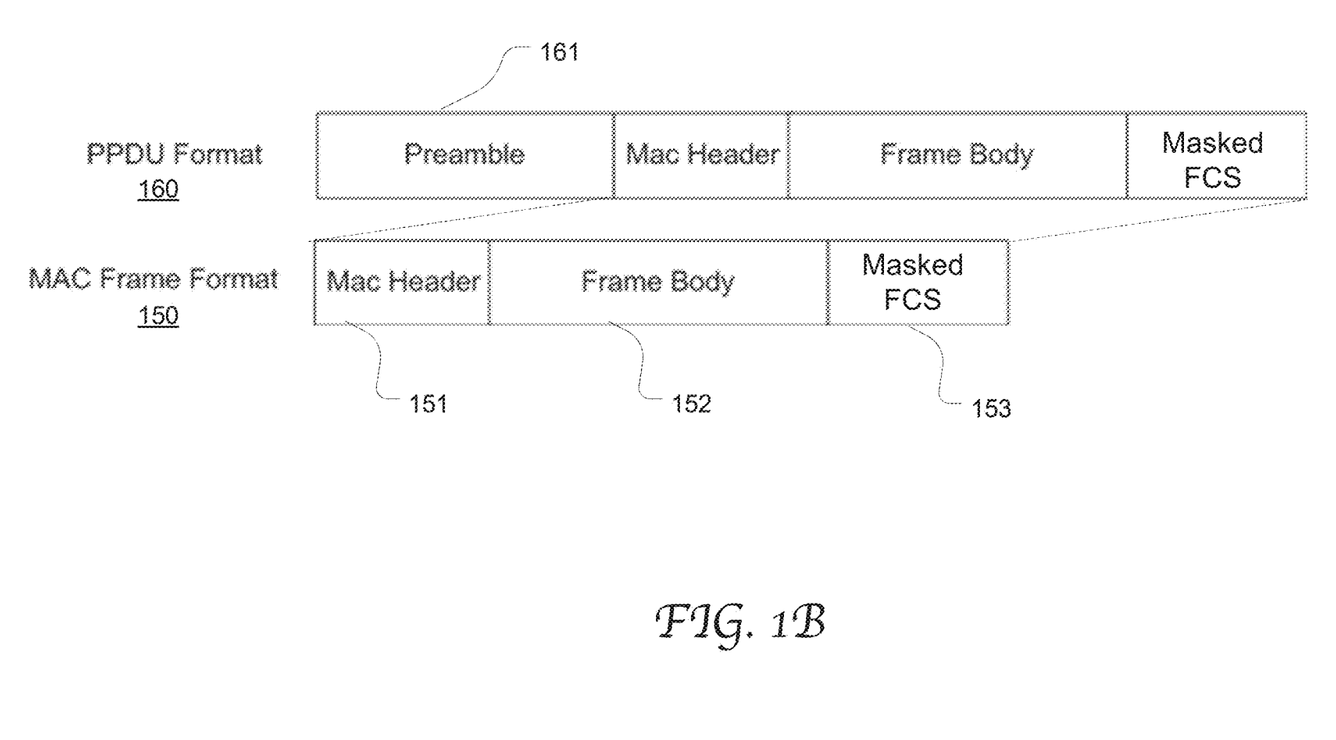
FIG. 1B shows the structures of an exemplary reused Media Access Control (MAC) frame and the associated Physical Protocol Data Unit (PPDU) in accordance with an embodiment of the present disclosure.

In some embodiments, a PMS can be applied on a portion of the MAC frame and thereby convert the MAC frame to a reused frame. FIG. 1B shows the structures of an exemplary reused Media Access Control (MAC) frame 150 and the associated Physical Protocol Data Unit (PPDU) 160 in accordance with an embodiment of the present disclosure. The PPDU 160 includes a preamble 161 and the MAC frame 150 which includes a MAC header 151, a frame body 152 and an FCS 153. The MAC header 151 generally has a fixed length and may contain fields for frame control, duration, address, optional sequence control information, optional Quality of Service (QoS) control information (for QoS data frames), and optional control. The frame body 152 may be of a variable length and contain information specific to the frame type and subtype. Control frames typically have a fixed length frame body.

The FCS 153 is an extra error-detection code added in a frame according to a communication protocol. For example, in IEEE 802.11a/b/g/n/ac/ax, an FCS contains a 24-bit Cyclic Redundancy Check (CRC) sequence. As illustrated, the FCS 153 of the MAC frame 150 is masked by a PMS and redefined as one or more new fields for indicating new control or signaling information. For example, a 24-bit PMS composed of "0" and "1" can be used. In some other embodiments, a PMS can be applied on the MAC header 151 or a portion thereof.

In some embodiments, a portion of an original frame can be redefined to multiple versions by using different combinations of predetermined masking operation and PMS. Thereby, the original frame can be converted to multiple reused frames according to multiple frame formats. Each of the reused frames can keep the same or similar length as the original frame, with the reused portion redefined into one or more fields for new information.

Figure 2A:
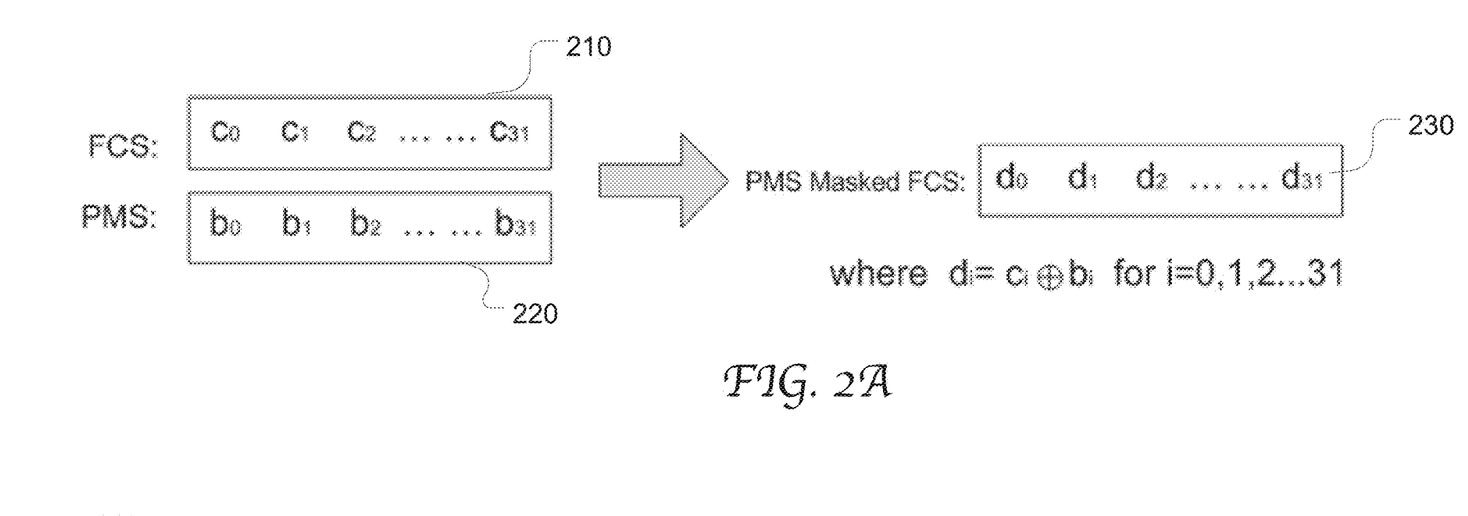
FIG. 2A is a diagram illustrating an exemplary process of applying a predetermined masking sequence (PMS) on a Frame Check Sequence (FCS) to generate a masked FCS in accordance with an embodiment of the present disclosure.

FIG. 2A is a diagram illustrating an exemplary process of applying a PMS 220 on an FCS 210 to generate a masked FCS 230 in accordance with an embodiment of the present disclosure. As shown, the FCS 210 and the PMS 220 both have 32 bits. However, the lengths of the FCS and PMS used herein are merely exemplary and the present disclosure is not limited thereto. In some other embodiments, the FCS and the PMS may have different lengths.

A predetermined masking operation, or a logical operation known to an intended receive device, is performed on the FCS 220 and the PMS 220 to produce the masked FCS 230. Any suitable logic operation can be applied on a PMS and a portion of a frame to generate a reused portion without departing from the scope of the present disclosure. Here a bit-wise exclusive or XOR operation is performed on the PMS and the FCS. For example, the PMS 220 is XOR-ed with the FCS 210 bit-wise.

Figure 2B:
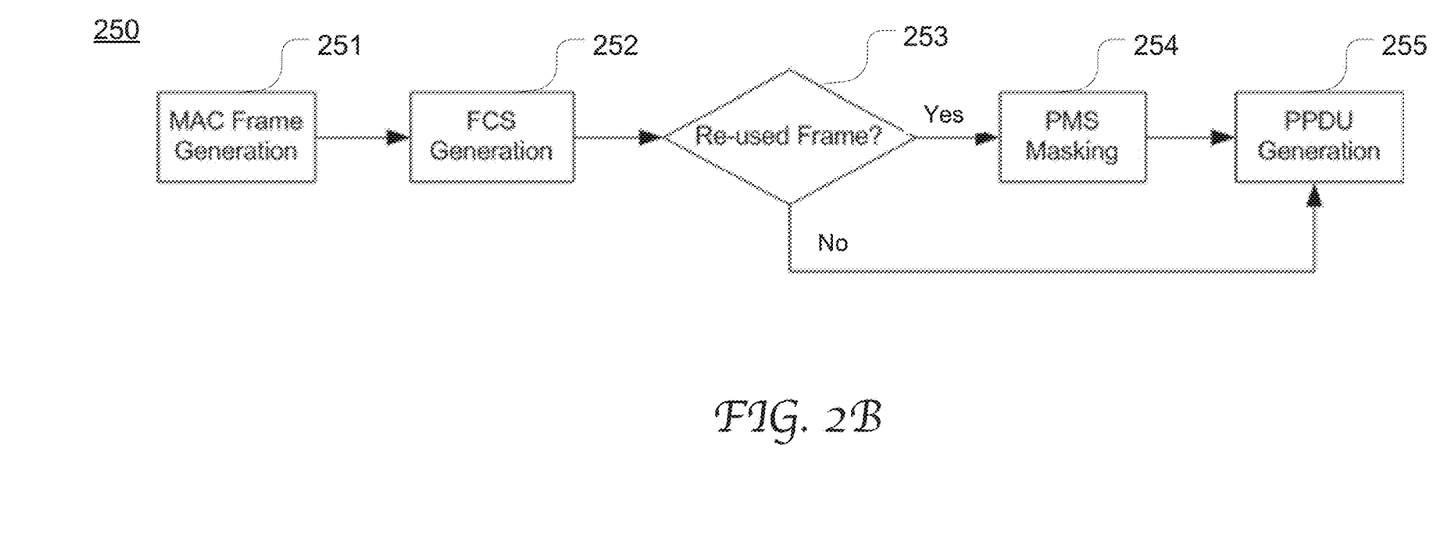
FIG. 2B is a flow chart depicting an exemplary process of generating a PPDU with a reused backward compatible frame in accordance with an embodiment of the present disclosure.

FIG. 2B is a flow chart depicting an exemplary process 250 of generating a PPDU with a reused backward compatible frame in accordance with an embodiment of the present disclosure. Process 250 may be performed by a device that supports the reuse scheme, e.g., an AP or an STA. Configured to generate a reused frame according to one frame format, the device also preserves the capability of generating a corresponding original frame according to another frame format.

More specifically, at 251, a MAC frame is generated according to the first frame format. At 251, an FCS is generated as an extra code for the MAC frame. At 253, it is determined whether a reused frame is to be generated according to the second frame format. If yes, a PMS and a masking operation corresponding to the second frame format is applied on the FCS at 254 to generate a PMS-masked FCS, e.g., as described with reference to FIG. 2A. The masked FCS thus contains new information according to the second frame format. A preamble is generated and attached to the frame, and thus the PPDU is generated at 255. This PPDU is intended for a receive device that can resolve the reuse frame according to the second frame format and knows the PMS as well as the masking operation used at 254. However, if it is determined that the frame is not intended to be a reused frame at 253, the PPDU is generated at 256 without the masking operation. This PPDU is intended for a receive device that can only resolve the original frame according to the first frame format.

Figure 3A:
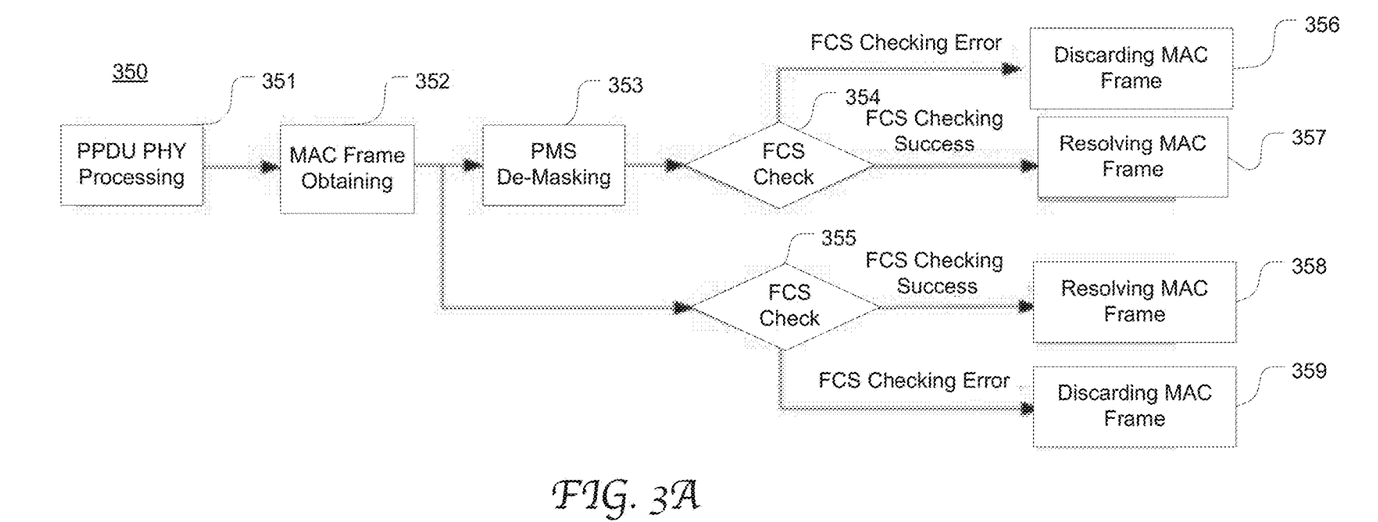
FIG. 3A is a flow chart depicting an exemplary process of processing a received PPDU with a reused frame in accordance with an embodiment of the present disclosure.

FIG. 3A is a flow chart depicting an exemplary process 350 of processing a received PPDU with a reused frame in accordance with an embodiment of the present disclosure. Process 350 may be performed by a receive device that supports the reuse scheme, e.g., an AP or an STA. Configured to resolve a reused frame according to one frame format, the device also preserves the capability of resolving a corresponding original frame according to another frame format. Process 350 allows the device to determine whether the received frame is a reused frame, e.g., whether it contains information defined in the first frame format or the second frame format.

More specifically, at 351, a physical layer (PHY) processing step is performed on a received PPDU. At 352, the MAC frame is derived from the PPDU. At 353, PMS de-masking is performed on the FCS of the MAC frame to generate a de-masked frame and a de-masked FCS. At 354, a CRC operation is performed based on the de-masked FCS. Concurrently or sequentially, at 355 a CRC operation is also performed based on the FCS as received and without de-masking.

If the CRC operations at 354 and 355 both result in errors, the received MAC frame is discarded at 356 and 359 as it is highly probable that there is an error during frame transmission. If the CRC operation at 354 results in a checking success while the CRC at 355 results in a checking error, the de-masked frame is then resolved according to the first frame format at 357. Conversely, if the CRC at 355 results in a checking success while the CRC at 354 results in a checking error, the frame as received is then resolved according to the second frame format at 358. It is noted that, in practice, it is highly improbable that both checking operations at 354 and 355 result in a CRC success.

In some other embodiments, if one of the CRC operations (e.g., at 354) results in a checking success, the other CRC operation (e.g., at 355) can be omitted because this checking success suffices to indicate the frame format used in the received frame (e.g., the first frame format).

Note that a legacy device that does not support the reuse scheme may receive a reused frame and will only perform a CRC operation based on the received FCS without de-masking. This results in a checking error, which is predictable, and accordingly the reused frame is discarded by the device and causes no incorrect operation thereof.

Figure 3B:
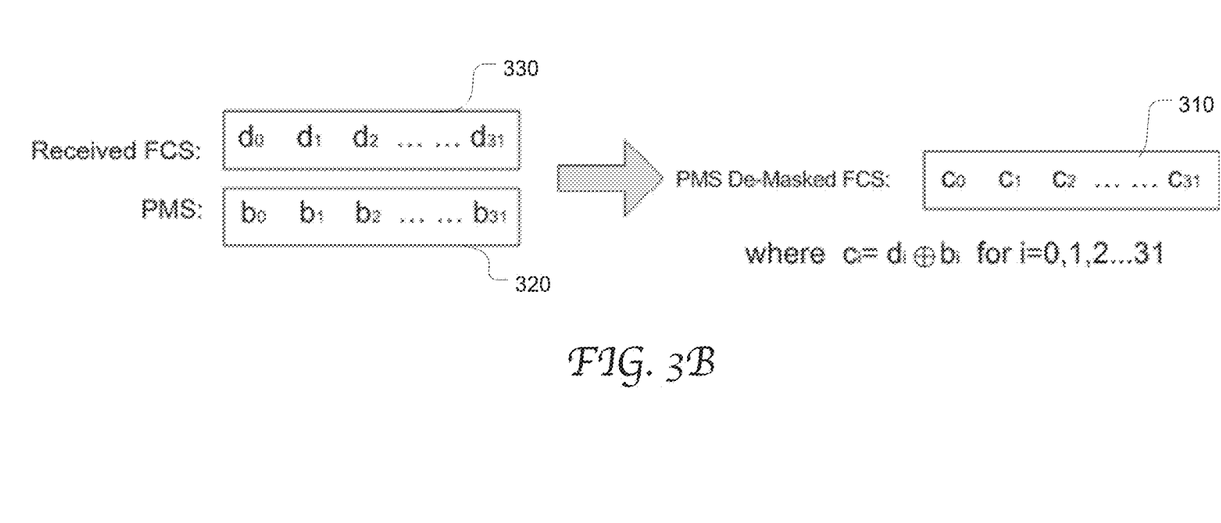
FIG. 3B is a diagram illustrating an exemplary process of applying a de-masking PMS on a received FCS to generate a de-masked FCS in accordance with an embodiment of the present disclosure.

FIG. 3B is a diagram illustrating an exemplary process of applying a de-masking PMS 320 on a received FCS 330 to generate a de-masked FCS 310 in accordance with an embodiment of the present disclosure. In this example, the de-masking PMS 320 has the same length as the received FCS 330.

In some embodiments, multiple reused frame formats may be defined based on an original frame format, for example, by using different combinations of PMS, predetermined masking operation, and reused portion of a frame. In this case, a receive device may be configured to perform all the predetermined de-masking operations on the potential reused portions using the corresponding de-masking PMSs, followed by FCS checking on all the de-masked portions. The checking results are then used to identify the frame format in the received frame.

Figure 4:
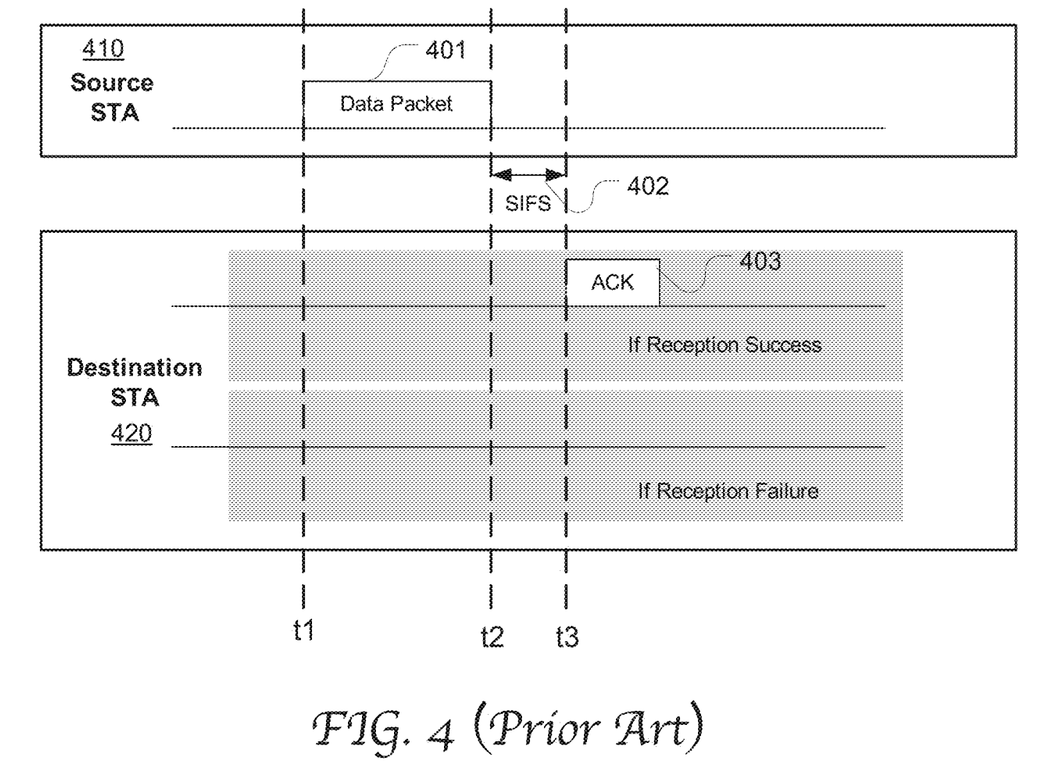
FIG. 4 illustrates a process and timing diagram of acknowledging a reception success in a wireless local area network (LAN) by using an ACK frame according to the prior art as defined in an IEEE 802.11 standard.

In some other embodiments, an acknowledge (ACK) frame for acknowledging a reception success can be reused to carry additional information that is not available in a conventional ACK frame. FIG. 4 illustrates process and timing diagram of acknowledging a reception success in a wireless local area network (LAN) by using an ACK frame according to the prior art as defined in an IEEE 802.11 standard. A source STA 410 and a destination STA 420 are communicably coupled through a wireless LAN. At time t1, the source STA 410 transmits a data packet 401 to the destination STA 420. At t2, the destination STA 420 receives the entire packet and decodes the packet. If the destination STA 420 decodes the received data packet 401 successfully, it transmits an ACK frame 403 to the source STA 410 at time t3. On the other hand, if a reception failure occurs, the destination STA 420 does not send any frame to the STA 410.

Thus, the source STA 410 expects to receive an ACK frame within a certain time slot that follows a Single-Inter-Frame Space (SIFS) from t2. If no ACK frame is received in the designated time slot (after t3), the source STA 410 treats the non-response as an indication of reception failure and automatically retransmits the packet. In an attempt to increase the chance of reception success, the retransmission may use link adaptation, for example by using a very low bit rate or Modulation and Coding Scheme (MCS).

However, a problem with this ACK scheme is that the source STA has no knowledge of what causes the reception failure in the circumstance that no ACK frame is received. The measures used for link adaptation are selected blindly and often too conservative, which in many cases reduces network performance and resource usage efficiency.

According to embodiments of the present disclosure, an ACK frame can be converted to a failure report frame by using a PMS. If the destination device declares a reception failure, such a failure report frame can be transmitted to a source device in the time slot that is originally designated for an ACK frame. The failure report frame may contain information useful for guiding retransmission of a packet, and particularly for link adaptation.

Generally, frame reception errors can be classified as type-A errors and type-B errors. A type-A error is detected if the signal (SIG) field decoding results in an error and the SIG FCS check fails. This is mainly caused by packet detection or preamble synchronization errors. In contrast, a type-B error is detected if the Physical Layer Convergence Procedure (PLCP) Service Data Unit (PSDU) decoding results in an error and the PSDU FCS check fails, while the SIG fields are decoded correctly and the SIG FCS check passes. This is mainly due to the problem that the Signal-to-Noise Ratio (SNR) is too low to support the MCS used in the PSDU. In practice, type-B errors happen much more frequently than type-A errors. For type-A errors, the packet length of a received packet can be resolved at the destination STA.

Link adaptation typically applies to type-B error situations. Embodiments transmitting a failure report frame in a time slot designated for an ACK frame to facilitate link adaption are described in detail in the co-pending U.S. patent application Ser. No. 15/146,995, entitled "RECEPTION FAILURE FEEDBACK SCHEME IN WIRELESS LOCAL AREA NETWORKS," filed on May 5, 2016, the entire content of which is herein incorporated by reference for all purposes.

In some embodiments, a frame transmitted from a source STA includes the ID or partial ID of an intended destination STA in the frame preamble. This serves to inform the destination STA that it is the intended recipient of the frame and that it needs to send back an ACK frame or a reused ACK frame. For example, in a Very High Throughput (VHT) packet, the preamble may include a partial ID of a destination STA; and in a High Efficiency (HE) packet, the SIG-B field in the preamble may include an ID of a destination ID.

Figure 5:
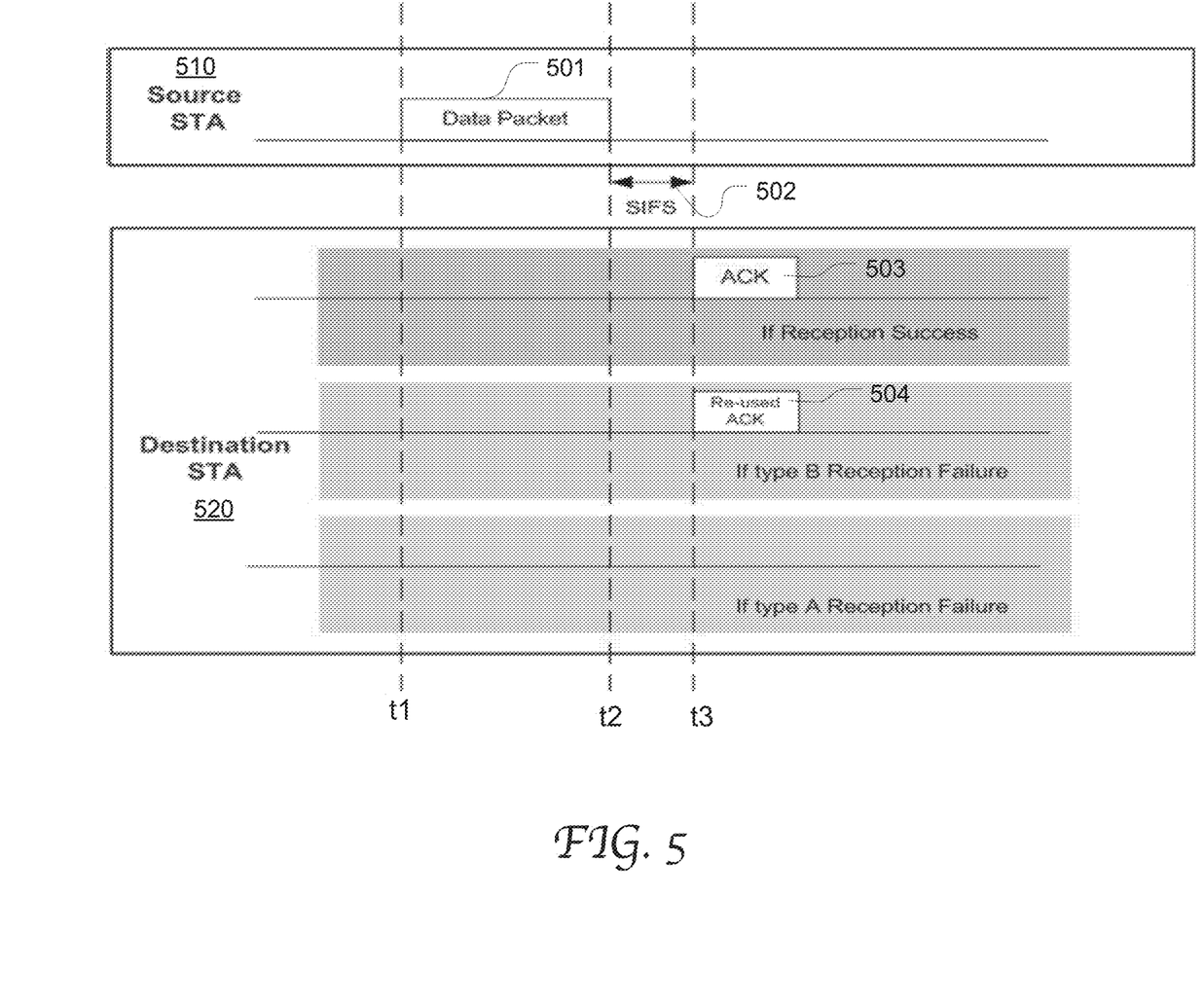
FIG. 5 illustrates an exemplary process and timing diagram of providing reception failure feedback in a wireless LAN by using a reused ACK frame in accordance with an embodiment of the present disclosure.

FIG. 5 illustrates an exemplary process and timing diagram of providing reception failure feedback in a wireless LAN by using a reused ACK frame in accordance with an embodiment of the present disclosure. At time t1, the source STA 510 transmits a data packet 501 to the destination STA 520. At t2, the destination STA 520 receives the entire packet at t2 and decodes the packet. If the destination STA 520 decodes the received data packet 501 successfully, it transmits an ACK frame 503 to the source 510 at time t3.

On the other hand, if a type-A reception failure occurs, the important information contained in the preamble is not correctly received, and therefore not much information available to the destination STA 520 can be used to facilitate subsequent retransmission by the source STA 510. Thus, the destination STA 520 does not send any frame to the STA 510 in this situation.

In a different situation, if a type-B reception failure occurs, much useful information can be provided by the destination STA 520 to guide subsequent retransmission. Thus, the destination STA 520 generates a reused ACK frame 504 (the failure report frame) and transmits it to the source device. The reused ACK frame is a backward compatible reuse frame with a PMS-masked FCS. It has the same frame length as the ACK frame but has fields redefined for information useful for fast link adaptation or other failure metrics report. Note that a reused ACK frame has no negative impact on legacy STAs, as stated above.

Figure 6:
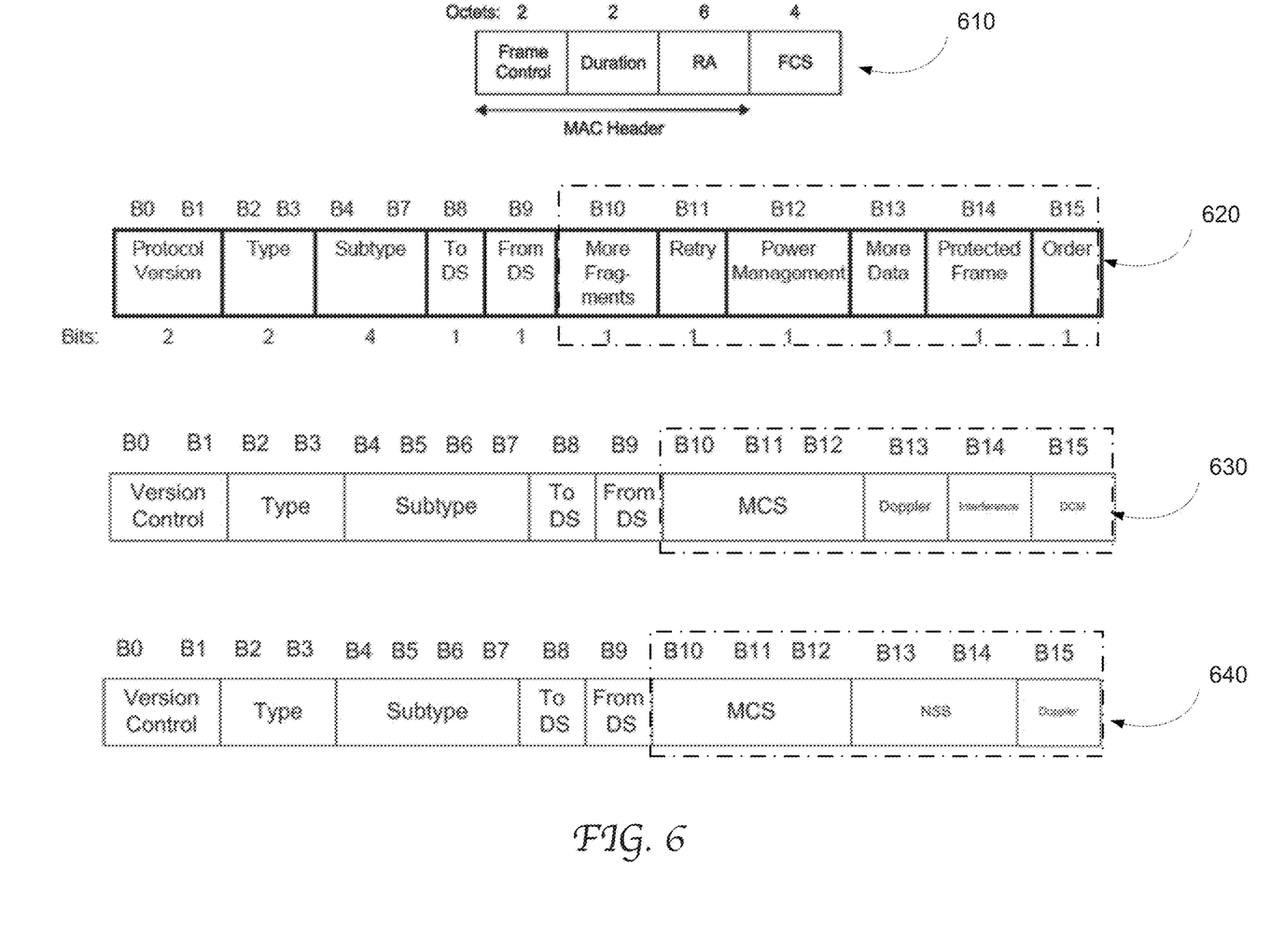
FIG. 6 illustrates the formats of two exemplary reused ACK frames comparing with the format of an ACK frame in accordance with an embodiment of the present disclosure.

FIG. 6 illustrates the formats of two exemplary reused ACK frames 630 and 640 comparing with the format of an ACK frame 620 in accordance with an embodiment of the present disclosure. Diagram 610 shows an ACK frame format defined in IEEE 802.11, including the portions for frame control, duration, receiver Address (RA) and FCS. Diagram 620 shows the fields in the 16-bit frame control portion in the ACK frame 610.

In some embodiments, by applying a PMS to the FCS in the ACK frame 620, the ACK frame may be reused as described in greater detail above with reference to FIGS. 1B, 2A and 2B. However, in the examples illustrated in FIG. 6, instead of using the FCS, the fields in the frame control portion are changed to contain information that can be used for fast link adaptation in a subsequent packet retransmission. As shown in the ACK frame diagram 620, bits B10-B15 of the frame control portion are used as fields of "More fragments," "Retry," "Power Management" "Protected Frame," and "Order." In the example shown in diagram 630, a PMS is applied to the Bits B10-B15 to convert the portion to a reused portion with new fields for MCS recommendation, Doppler indication, interference indication and Dual Carrier Modulation (DCM) indication. In the other example shown in diagram 640, another PMS is applied to the Bits B10-B15 to convert them to a reused portion having fields for MCS recommendation, Doppler indication, interference indication, and Number of Spatial Stream (NSS) recommendation. The processes of generating, processing and resolving the reused ACK frames can be performed as described above in greater detail with reference to FIGS. 2A, 2B, 3A and 3B.

Figure 7:
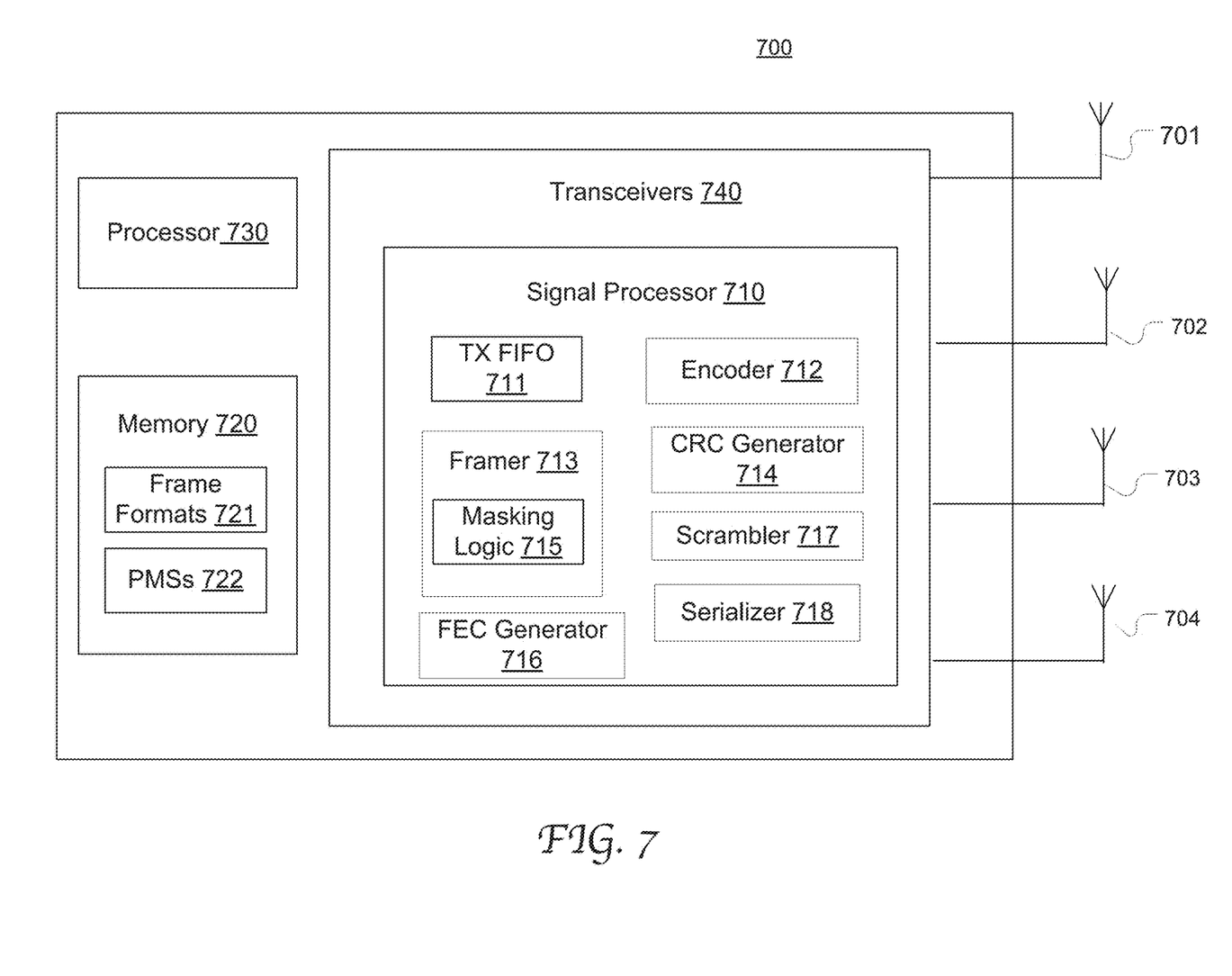
FIG. 7 is a block diagram illustrating the configuration of an exemplary device operable to generate a reused frame by using a PMS according to an embodiment of the present disclosure.

FIG. 7 is a block diagram illustrating the configuration of an exemplary electronic device 700 operable to generate a reused frame by using a PMS according to an embodiment of the present disclosure. The device 700 may be an AP, PCP or STA and can transmit reused frames to another device through a wireless LAN. The device 700 is configured to select a frame format (reused or original) and generate a frame, e.g., by performing the process 250 in FIG. 2B.

The device 700 may be a general-purpose computer or any other type of computing device or network device, including a main processor 730, a memory 720 and a transceiver 740 coupled to an array of antenna 701-704. The transceiver 740 includes a signal processor 710 having various modules of the transmit path which is configured to generate a PPDU or any other type of communication transmission units. For instance, the signal processor 710 includes a transmit First-In-First-Out (TX FIFO) 711, an encoder 712, a framer 713, a Forward Error Correction (FEC) Generator 716, a CRC generator 714, a scrambler 717 and a serializer 718.

The memory 720 stores reused as well as original frame formats 721 and the PMSs 722 applicable to a particular control or management frame, e.g., an ACK frame. When generating such a frame, the framer 713 determines whether to configure it as a reused frame and accordingly selects a frame format from the format bank 721. If it is a reused frame, the masking logic 715 in the framer 713 can perform a predetermined logical operation (e.g., bit-wise XOR) on the reused portion of the frame and a PMS, as described in greater detail with reference to FIGS. 2A, 2B and 6.

The device 700 is also capable of receive a data packet from another device, and according generate a feedback ACK frame or reused ACK frame as described in greater detail with reference to FIGS. 5 and 6.

Figure 8:
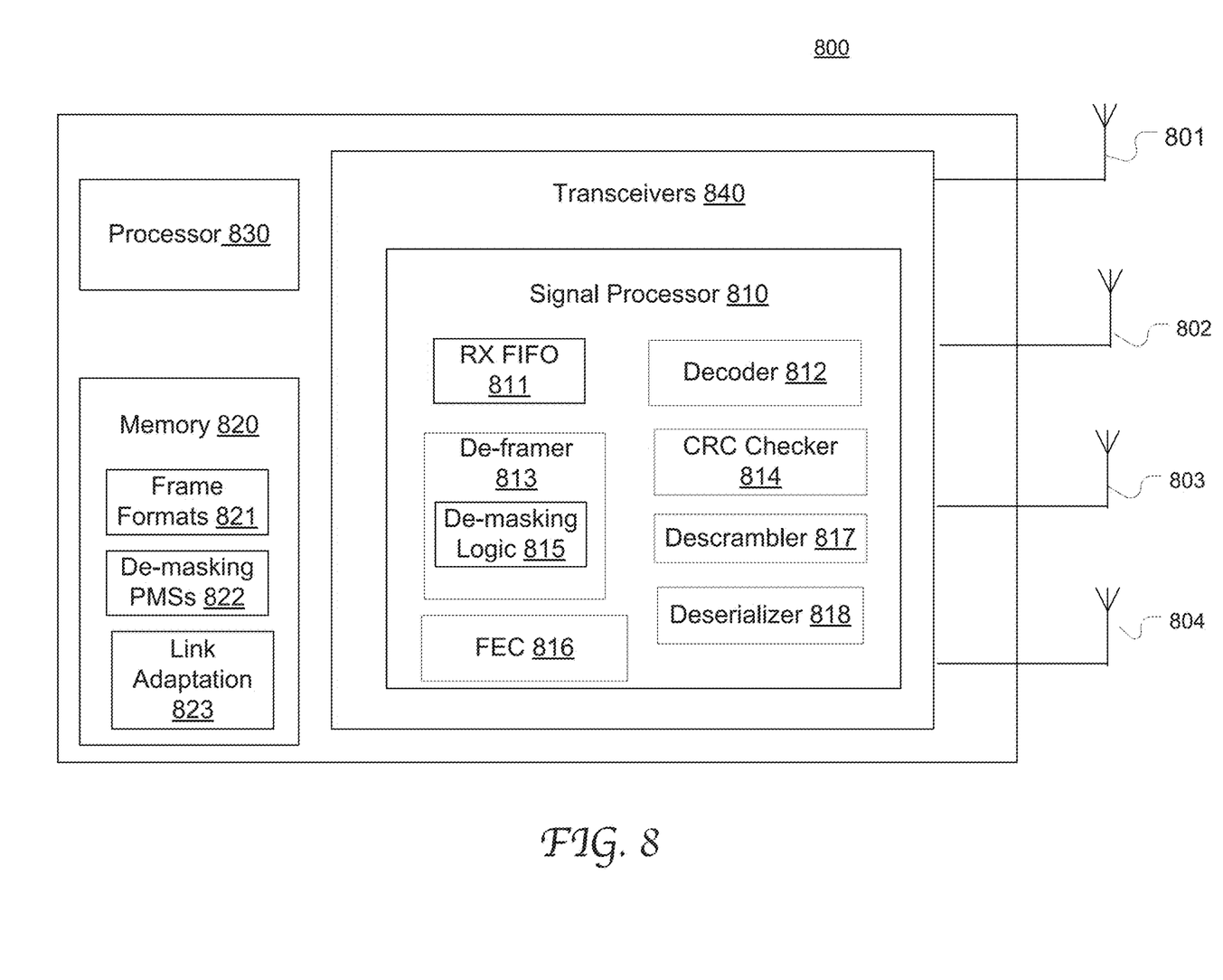
FIG. 8 is a block diagram illustrating the configuration of an exemplary device operable to receive and resolve a reused frame according to an embodiment of the present disclosure.

FIG. 8 is a block diagram illustrating the configuration of an exemplary device 800 operable to receive and resolve a reused frame according to an embodiment of the present disclosure. The device 800 may be an AP, PCP or STA and can resolve a reused frames received through a wireless LAN, e.g., by performing the process 350 in FIG. 3A.

The device 800 may be a general-purpose computer or any other type of computing device or network device, including a main processor 830, a memory 820 and a transceiver 840 coupled to an array of antennas 801-804. The transceiver 840 includes a signal processor 810 having various modules of the receive path configured to receive a PPDU or any other type of communication transmission units. The signal processor 810 includes a receive First-In-First-Out (TX FIFO) 811, a decoder 812, a deframer 813, a FEC module 816, a CRC checker 814, a descrambler 817 and a deserializer 818.

The memory 820 may store multiple frame formats 821 and the de-masking PMSs 822 applicable to a reused control or management frame. Upon receiving a frame that could potentially be a reused frame (e.g., a reused ACK frame), the deframer 813 processes the frame by using the de-masking logic and applying all the possible de-masking PMSs, as well as without any de-masking operation. The CRC checker 814 performs CRC operations to produce checking results which can be used to identify the particular format of the received frame, as described in greater detail with reference to FIGS. 3A and 3B.

The device 800 can also transmit a data packet to another device. The memory 820 also includes a link adaptation module 830 which can dynamically adapt various aspects of a transmission link based on feedback from another device. Particularly, the link adaptation module 823 can use the information in a reused ACK frame to determine various parameters for retransmitting a packet, as described in greater detail with reference to FIGS. 5 and 6.

It will be appreciated that each of the signal processors in FIG. 7 and FIG. 8 may include a wide range of other suitable components that are well known in the art. The various components can be implemented in any suitable manner that is well known in the art and can be implemented using hardware logic, software logic or a combination thereof. Further, in some embodiments, the transceiver 710 may as well include the components in a receive path as described in greater detail with reference to the transceiver 810 in FIG. 8, and vice versa.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication, said method comprising,
    generating a frame comprising a first portion, wherein said first portion indicates first information in compliance with a first frame format, wherein said frame is one of: a control frame and a management frame;
    converting said frame to a modified frame by masking said first portion to generate a masked portion indicating second information in compliance with a second frame format, wherein said masking comprises performing a first predetermined logical operation on a predetermined masking sequence and said first portion;
    transmitting said modified frame through a wireless network; and
    responsive to a reception failure, receiving an acknowledgment frame from a destination device, wherein the acknowledgment frame comprises fields redefined to include metrics pertaining to the reception failure.

2. The method of claim 1, wherein said performing said first predetermined logical operation comprises performing an XOR operation.

3. The method of claim 1, wherein said first frame format is substantially compliant with a first communication protocol, and wherein said second frame format is substantially compliant with a second communication protocol.

4. The method of claim 1, wherein said frame comprises a Media Access Control (MAC) frame, and wherein further said first portion comprises a Frame Check Sequence (FCS) in said MAC frame according to said first frame format.

5. The method of claim 1, wherein said first portion is encompassed by a header of said MAC frame.

6. The method of claim 1,
wherein said frame is an acknowledgement frame scheduled to be transmitted in a designated time slot to indicate a successful reception of a particular frame,
wherein said second information indicates information of said particular frame related to one or more of: a frame reception failure; a type of frame reception error; a retransmission request; a recommended modulation coding scheme for retransmission; an interference level; a Doppler indicator; Dual Carrier Modulation (DCM); and a number of spatial stream indication recommendation, and
wherein further said transmitting comprises transmitting said modified frame in said designated time slot.

7. The method of claim 6, wherein a preamble of said particular frame comprises an identification or a partial identification of an intended recipient device.

8. A method of wireless communication, said method comprising:
receiving a frame transmitted through a wireless network, wherein said frame comprises a first portion, wherein said frame is one of: a control frame and a management frame;
processing said first portion in accordance with a first frame format, wherein said first portion in said first frame format indicates first information;
processing said first portion in accordance with a second frame format, wherein said first portion in said second frame format indicates second information, wherein said processing said first portion in accordance with said first frame format comprises performing a predetermined de-masking operation on said first portion, wherein said processing said first portion in accordance with said second frame format is performed without said predetermined de-masking operation, wherein said frame comprises a Media Access Control (MAC) frame, and wherein said first portion comprises a Frame Check Sequence (FCS) in said MAC frame according to said first frame format; and
responsive to a reception failure, transmitting an acknowledgment frame to a device transmitting the frame, wherein the acknowledgment frame comprises fields redefined to include metrics pertaining to the reception failure.

9. The method of claim 8, wherein said processing said first portion in accordance with said first frame format comprises:
applying a predetermined de-masking operation on said FCS to produce a de-masked FCS; and
performing a Cyclic Redundancy Check (CRC) operation based on said de-masked FCS to produce a first check result,
wherein said processing said first portion in accordance with a second frame format comprises performing a CRC operation based on said FCS without said predetermined de-masking operation to obtain a second check result,
and further comprising
responsive to determining that said first check result and said second check result both indicate a CRC error, indicating a reception error of said frame;
responsive to determining that said first check result indicates a CRC success, resolving said MAC frame in accordance with said first frame format; and
responsive to determining that said second check result indicates a CRC success, resolving said MAC frame in accordance with said second frame format.

10. The method of claim 8, wherein said frame is received in a time slot designated for an acknowledgement frame, wherein said first information indicates reception success of a particular frame, and wherein said second information indicates information of said particular frame related to one or more of: a frame reception failure; a type of frame reception error; a retransmission request; a recommended modulation coding scheme for retransmission; an interference level; a Doppler indicator; Dual Carrier Modulation (DCM); and a number of spatial stream indication recommendation.

11. The method of claim 10, wherein a preamble of said particular frame comprises an identification or a partial identification of an intended recipient device of said particular frame, and further comprising configuring retransmission of said particular frame based on said second information.

12. A device for wireless communication, said device comprising:
a memory;
a processor coupled to said memory; and
a transceiver comprising a signal processor and coupled to said processor and said memory, said transceiver configured to:
generate a frame comprising a first portion, wherein said first portion indicates first information in compliance with a first frame format, wherein said frame is one of: a control frame and a management frame;
convert said frame to a modified frame by masking said first portion to generate a masked portion indicating second information in compliance with a second frame format, wherein said masking comprises performing a first predetermined logical operation on a predetermined masking sequence and said first portion;
transmit said modified frame through a wireless network;
responsive to a reception failure, receive an acknowledgment frame from a destination device, wherein the acknowledgment frame comprises fields redefined to include metrics pertaining to the reception failure; and
convert said frame to another modified frame by performing a second predetermined logical operation on a second predetermined masking sequence and said first portion in compliance with a third frame format.

13. The device of claim 12, wherein said transceiver comprises XOR logic configured to perform said first predetermined logical operation.

14. The device of claim 12, wherein said first frame format substantially complies with a first communication protocol, and wherein said second frame format substantially complies with a second communication protocol.

15. The device of claim 12, wherein said frame is a Media Access Control (MAC) frame, and wherein further said first portion is a Frame Check Sequence (FCS) in said MAC frame according to said first frame format.

16. The device of claim 12, wherein said frame is an acknowledgement frame scheduled to be transmitted in a designated time slot and indicates a successful reception of a particular frame, and wherein said second information indicates information of said particular frame related to one or more of: a frame reception failure; a type of frame reception error; a retransmission request; a recommended modulation coding scheme; an interference level; a Doppler indicator; Dual Carrier Modulation (DCM); and a number of spatial stream indication recommendation, and wherein further said transceiver is configured to transmit said modified frame in said designated time slot.

17. The device of claim 16, wherein a preamble of said particular frame comprises an identification or a partial identification of an intended recipient device of said particular frame.

18. A device for wireless communication, said device comprising:
a memory;
a processor coupled to said memory; and
a transceiver comprising a signal processor and configured to:
receive a frame transmitted through a wireless network, wherein said frame comprises a first portion, wherein said frame is one of: a control frame and a management frame;
process said first portion in accordance with a first frame format, wherein said first portion in said first frame format indicates first information, wherein said transceiver is configured to perform a predetermined de-masking operation on said first portion to produce a de-masked portion compliant with said first frame format;
process said first portion in accordance with a second frame format, wherein said first portion in said second frame format indicates second information, wherein said frame is a Media Access Control (MAC) frame, and wherein said first portion is a Frame Check Sequence (FCS) in said MAC frame according to said first frame format; and
responsive to a reception failure, transmitting an acknowledgment frame to a device transmitting the frame, wherein the acknowledgment frame comprises fields redefined to include metrics pertaining to the reception failure.

19. The device of claim 18, wherein said transceiver is further configured to process said first portion in accordance with said first frame format by:

applying a predetermined de-masking operation on said FCS to produce a de-masked FCS; and
performing a Cyclic Redundancy Check (CRC) operation based on said masked FCS to produce a first check result,
wherein said transceiver is configured to process said first portion in accordance with said second frame format by performing a CRC operation based on said FCS to obtain a second check result without said predetermined de-masking operation, and
wherein said transceiver is further configured to:
responsive to determining that said first check result and said second check result both indicate a CRC error, indicate reception error of said frame;
responsive to determining that said first check result indicates a CRC success, resolve said MAC frame in accordance with said first frame format; and
responsive to determining that said second check result indicates a CRC success, resolve said MAC frame in accordance with said second frame format.

20. The device of claim 18, wherein said frame is transmitted in a time slot designated for an acknowledgement frame, wherein said first information indicates reception success of a particular frame, and wherein said second information indicates information of said particular frame related to one or more of: a reception failure; a type of frame reception error; a retransmission request; a recommended modulation coding scheme; an interference level; a Doppler indicator; Dual Carrier Modulation (DCM); and a number of spatial stream indication recommendation.

21. The device of claim 20, wherein a preamble of said particular frame comprises an identification or a partial identification of an intended receive device of said particular frame, and wherein said transceiver is further configured to configure retransmission of said particular frame based on said second information.

* * * * *